United States Patent
Kristen et al.

(10) Patent No.: US 6,812,305 B2
(45) Date of Patent: Nov. 2, 2004

(54) METHOD FOR THE PRODUCTION OF A CATALYST SYSTEM FOR THE POLYMERIZATION OF OLEFINS

(75) Inventors: Marc Oliver Kristen, Limburgerhof (DE); Gerhard Hauck, Boehl-Iggelheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 38 days.

(21) Appl. No.: 10/240,273
(22) PCT Filed: Apr. 4, 2001
(86) PCT No.: PCT/EP01/03829
§ 371 (c)(1), (2), (4) Date: Sep. 30, 2002
(87) PCT Pub. No.: WO01/77187
PCT Pub. Date: Oct. 18, 2001

(65) Prior Publication Data
US 2003/0045660 A1 Mar. 6, 2003

(30) Foreign Application Priority Data
Apr. 8, 2000 (DE) .......................... 100 17 660

(51) Int. Cl.[7] .............................. G08F 4/602; G08F 4/70
(52) U.S. Cl. .................... 526/161; 526/169.1; 526/134; 526/172; 502/104; 502/107; 502/114; 502/115; 502/117; 502/129; 502/155; 502/167
(58) Field of Search .............................. 526/161, 172, 526/134, 169.1; 502/104, 107, 114, 115, 117, 129, 155, 167

(56) References Cited

FOREIGN PATENT DOCUMENTS

| EP | 0 277 004 | 8/1988 |
|---|---|---|
| EP | 0 468 537 | 1/1992 |
| EP | 0 561 479 | 9/1993 |
| WO | 96/23010 | 8/1996 |
| WO | 98/27124 | 6/1998 |
| WO | WO98/27124 | * 6/1998 |
| WO | 98/30612 | 7/1998 |
| WO | WO99/12981 | * 3/1999 |
| WO | 99/12981 | 3/1999 |

OTHER PUBLICATIONS

Hans–Herbert Brintzinger et al.: "Stereospezifische olfinpolymerisation mit chiralen metalloceakatalysatoren" Angew. Chem., vol. 107, pp. 1255–1283.

George J.P. Britovsek et al.: "Iron and cobalt ethylene polymerization catalysts bearing 2,6–bis(imino)pyridyl ligands: synthesis, structures, and polymerization studies" J. Am. Chem., vol. 121, pp. 8728–8740 1999.

George J.P. Britovsek et al.: "Novel olefin polymerization catalysts based on iron and cobalt" Chem. Commun., pp. 849–850 1998.

Brooke L. Small et al.: "Highly active iron and cobalt catalysts for the polymerization of ethylene" J. Am. Chem. Soc., vol. 120, pp. 4049–4050 1998.

X. Yang et al.: "Cation–like' homogenous olefin polymerization catalysts based upon zirconocene alkyls and tris(pentafluorophenyl)borane" J. Am. Chem., vol. 113, No. 9, pp. 3623–3625 1991.

* cited by examiner

Primary Examiner—Roberto Rabago
(74) Attorney, Agent, or Firm—Oblon, Spivak, McClelland, Maier & Neustadt, P.C.

(57) ABSTRACT

A catalyst system for the polymerization of olefins is prepared by initially charging one or more compounds of the formula I a or I b,

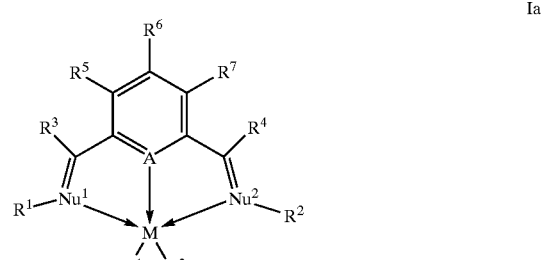

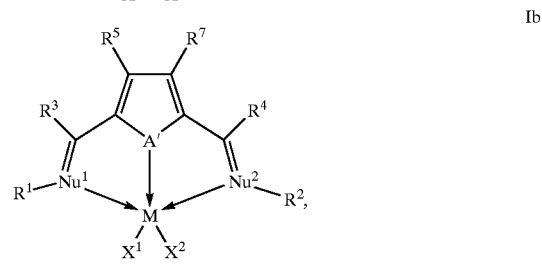

subsequently adding a molecularly defined activator of the formulae II a to c

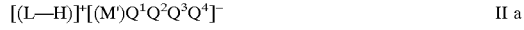

[(L—H)]$^+$[(M')Q$^1$Q$^2$Q$^3$Q$^4$]$^-$     II a

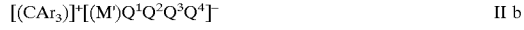

[(CAr$_3$)]$^+$[(M')Q$^1$Q$^2$Q$^3$Q$^4$]$^-$     II b

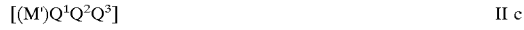

[(M')Q$^1$Q$^2$Q$^3$]     II c and finally adding an alkylating agent selected from among LiR$^{11}$, MgR$^{11}$R$^{12}$ and AlR$^{12}$R$^{13}$R$^{14}$.

17 Claims, No Drawings

METHOD FOR THE PRODUCTION OF A CATALYST SYSTEM FOR THE POLYMERIZATION OF OLEFINS

BACKGROUND OF THE INVENTION

The present invention relates to a process for preparing a catalyst system for the polymerization of olefins, which comprises initially charging one or more compounds of the formula I a or I b,

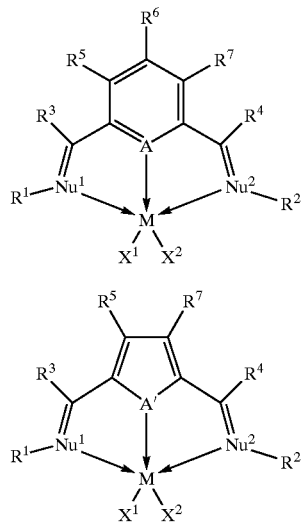

where the variables are defined as follows:
M is a transition metal of groups 5 to 10 of the Periodic Table of the Elements,
A is selected from among N, P and As,
A' is selected from among O and S,
$Nu^1$, $Nu^2$ are N or P,
$X^1$, $X^2$ are halogen or $C_1$–$C_4$-alkoxy;
$R^1$, $R^2$ are unsubstituted or substituted $C_1$–$C_{12}$-alkyl, $C_3$–$C_{12}$-cycloalkyl, $C_7$–$C_{15}$-aralkyl, $C_6$–$C_{14}$-aryl or five- or six-membered N-containing heteroaryl,
$R^3$, $R^4$ are hydrogen, unsubstituted or substituted $C_1$–$C_{12}$-alkyl, $C_3$–$C_{12}$-cycloalkyl, $C_7$–$C_{15}$-aralkyl, $C_6$–$C_{14}$-aryl or five- or six-membered N-containing heteroaryl,
$R^5$ to $R^7$ are each selected independently from among hydrogen, unsubstituted or substituted $C_1$–$C_{12}$-alkyl, $C_3$–$C_{12}$-cycloalkyl, $C_7$–$C_{15}$-aralkyl, $C_6$–$C_{14}$-aryl and five- and six-membered N-containing heteroaryl, halogen, $C_1$–$C_6$-alkoxy, $NO_2$, $SiR^8R^9R^{10}$ and $OSiR^8R^9R^{10}$ where adjacent radicals together with the parent heteroaryl may form a 5- to 10-membered ring,
$R^8$ to $R^{10}$ are selected independently from among hydrogen and substituted or unsubstituted $C_1$–$C_{12}$-alkyl, $C_3$–$C_{12}$-cycloalkyl, $C_7$–$C_{15}$-aralkyl and $C_6$–$C_{14}$-aryl; then adding a molecularly defined activator of the formulae II a to c $$[(L\!-\!H)]^+[(M')Q^1Q^2Q^3Q^4]^- \qquad \text{II a}$$

$$[(CAr_3)]^+[(M')Q^1Q^2Q^3Q^4]^- \qquad \text{II b}$$

$$[(M')Q^1Q^2Q^3] \qquad \text{II c}$$

where the radicals have the following meanings:

$[L\!-\!H]^+$ is a Brønsted acid, where L is an electron-neutral Lewis base,
M' is an element of group 13 of the Periodic Table of the elements,
$Q^1$ to $Q^4$ are selected independently from among hydride, unsubstituted or substituted $C_1$–$C_{12}$-alkyl, $C_3$–$C_{12}$-cycloalkyl, $C_7$–$C_{15}$-aralkyl, $C_6$–$C_{14}$-aryl and halide, with the proviso that not more than two radicals $Q^1$ and $Q^2$ are halide;
Ar are identical or different and are selected from among unsubstituted or substituted $C_6$–$C_{14}$-aryl,
and finally adding an alkylating agent selected from among $LiR^{11}$, $MgR^{11}R^{12}$ and $AlR^{12}R^{13}R^{14}$, where
$R^{11}$ to $R^{14}$ are selected independently from among unsubstituted or substituted $C_1$–$C_{12}$-alkyl, $C_3$–$C_{12}$-cycloalkyl, $C_7$–$C_{15}$-aralkyl and $C_6$–$C_{14}$-aryl.

The present invention also provides the catalyst system prepared by the abovementioned process and provides a process for the polymerization and copolymerization of olefins using this catalyst system.

DESCRIPTION OF THE BACKGROUND

Polymers and copolymers of olefins are of great economic importance since the monomers are readily available in large quantities and the polymers can be varied within a wide range by variation of the production process or the processing parameters. In the production process, the catalyst used is of particular significance. Apart from Ziegler-Natta catalysts, various single-site catalysts are of increasing importance. As central atoms, not only Zr as in metallocene catalysts (H.-H. Brintzinger et al., *Angew. Chem.* 1995, 107, 1255) but also Ni or Pd (WO 96/23010) or Fe and Co (e.g. WO 98/27124) have been examined in detail in recent times. The complexes of Ni, Pd, Fe and Co are also referred to as complexes of late transition metals.

Metallocene catalysts have disadvantages for industrial use. The catalysts are very sensitive to impurities in the industrially available monomers, in the process gas and in the solvents used. Interfering impurities are, for example, moisture and oxygen and also CO. Furthermore, the price of Zr as central metal of the industrially important zirconocenes is very high.

While Ni or Pd complexes (WO 96/23010) catalyze the formation of highly branched, commercially less interesting polymers, the use of Fe or Co complexes leads to the formation of highly linear polyethylene. G. J. P. Britovsek et al., *J. Am. Chem. Soc.* 1999, 121, 8728 and V. C. Gibson et al., *J. Chem. Soc., Chem. Commun.* 1998, 849 and also M. Brookhart et al., *J. Am. Chem. Soc.* 1998, 120, 4049 disclose polymerization-active complexes of Fe and Co with pyridyl-2,6-diimine ligands which are substituted by aryl groups on the imine nitrogen. As cocatalysts for the polymerization of ethylene, use is made of methylaluminoxane ("MAO") or modified methylaluminoxane ("MMAO") in which a certain percentage of the methyl groups has been replaced by isobutyl groups.

However, the use of MAO or other aluminoxanes also has disadvantages:

MAO and other aluminoxanes have to be used in a large molar excess, customarily a 100- to 1000-fold excess. The cocatalyst thus becomes a significant cost factor for the catalysts.

The catalysts activated with aluminoxanes are customarily introduced in polymerization-active form into the ongoing process, for example a gas-phase, solution, suspension or bulk polymerization process, and can lead to blockages, particularly in the lines through which the catalyst is metered in.

Aluminoxanes are molecularly undefined substances whose ability to activate transition metal complexes is very dependent on the process of preparation and impurities. Furthermore, the storage temperature and the storage time play a roll. Quality control is difficult.

Aluminoxanes always have to be stored at low temperatures because otherwise they tend to gel. Aluminoxane gels are unsuitable as cocatalysts.

Aluminoxanes are sold as solutions, so that a large amount of otherwise worthless solvent has to be transported.

Aluminoxanes, particularly those containing $C_1$–$C_4$-alkyl groups, and their solutions are pyrophoric and require an increased level of safety measures.

Molecularly defined activators which do not have the above disadvantages have proven useful for metallocenes. Examples are disclosed in EP-A 0 277 004, EP-A 0 468 537 and EP-A 0 561 479; further examples may be found in EP-A 0 426 638. These examples are salts having large, noncoordinating or only weakly coordinating anions such as the tetrakispentafluorophenylborate anion, or strong Lewis acids such as $B(C_6F_5)_3$ (X. Yang et al., *J. Am. Chem. Soc.* 1991, 113, 3623). These salts are reacted with the dialkyl derivative of a metallocene. Elimination of an alkyl anion from the metallocene compound is brought about by the counterion which is either a Brønsted acid or a Lewis acid. However, it is important that the dialkyl-metallocene compounds usually used are commercially available or can easily by obtained from the metallocene dichloride. This is frequently not the case for the corresponding complexes of late transition metals.

WO 98/27124 and WO 98/30612 concern the polymerization of ethylene and propylene. In the methods described here, an Fe or Co complex of a tridentate pyridyldiimine ligand is brought into contact with ethylene or propylene or another monomer; MAO or an activator having a defined structure is subsequently added, followed by an aluminum alkyl. The procedure is to admix a complex of a late transition metal, in this case an Fe or Co complex, in the presence of ethylene firstly with trialkylaluminum and subsequently with a strong Lewis acid such as $B(C_6F_5)_3$. The low activity of 8 or 13 kg of polyethylene/mol of Co).h for the systems disclosed is disadvantageous. Such low-activity catalyst systems are unsuitable for industrial processes.

WO 99/12981 concerns catalyst systems having tridentate pyridyldiimine ligands as catalysts for the polymerization of 1-olefins. Example 29 demonstrates the polymerization using a molecularly defined activator, specifically a tetrakispentafluorophenylborate, and (trimethylsilylmethyl) magnesium chloride as alkylating agent. The trimethylsilylmethyl anion is very bulky and has to be chosen because it enables reductive elimination of the alkyl groups on the late transition metal to be prevented. The procedure, which has also been described in a presentation by V. C. Gibson at "The VIIIth International Conference on organometallic Chemistry" on Aug. 16–21, 1998 in Munich, is not appropriate for industrial use because the special reagents required for the alkylation, for example (trimethylsilylmethyl)magnesium chloride, trimethylsilylmethyllithium or tris(trimethylsilylmethyl)aluminum, are very expensive.

SUMMARY OF THE INVENTION

It is an object of the present invention to provide a process by means of which complexes of late transition metals can be activated using a molecularly defined activator so as to enable which are commercially available in large quantities and are thus inexpensive can be used.

We have found that this object is achieved by adhering to a specific order in the reaction of the reactants. The process of the present invention can be described as follows:

One or more compounds of the formula I a or I b,

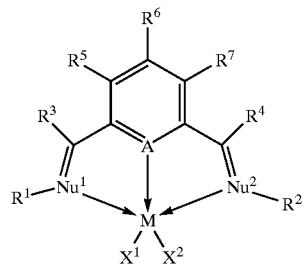

Ia

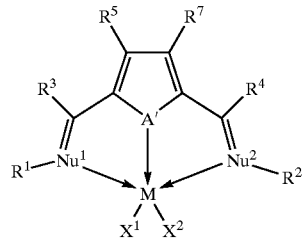

Ib where the variables are defined as follows:
  M is a transition metal of groups 5 to 10 of the Periodic Table of the Elements,
  A is s elect ed from among N, P and As,
  A' is selected from among O and S,
  $Nu^1$, $Nu^2$ are N or P,
  $X^1$, $X^2$ are halogen or $C_1$–$C_4$-alkoxy;
  $R^1$, $R^2$ are unsubstituted or substituted $C_1$–$C_{12}$-alkyl, $C_3$–$C_{12}$-cycloalkyl, $C_7$–$C_{15}$-aralkyl, $C_6$–$C_{14}$-aryl or five- or six-membered N-containing heteroaryl,
  $R^3$, $R^4$ are hydrogen, unsubstituted or substituted $C_1$–$C_{12}$-alkyl, $C_3$–$C_{12}$-cycloalkyl, $C_7$–$C_{15}$-aralkyl, $C_6$–$C_{14}$-aryl or five- or six-membered N-containing heteroaryl,
  $R^5$ to $R^7$ are each selected independently from among hydrogen, unsubstituted or substituted $C_1$–$C_{12}$-alkyl, $C_3$–$C_{12}$-cycloalkyl, $C_7$–$C_{15}$-aralkyl, $C_6$–$C_{14}$-aryl and five- and six-membered N-containing heteroaryl, halogen, $C_1$–$C_6$-alkoxy, $NO_2O$, $SiR^8R^9R^{10}$ and $OSiR^8R^9R^{10}$ where adjacent radicals together with the parent heteroaryl may form a 5- to 10-membered ring is/are initially charged.

The variables in the formulae I a and b preferably having the following meanings:
  M is V, Cr, Fe, Ru or Co, particularly preferably Fe;
  A is N,
  A' is S,
  $Nu^1$, $Nu^2$ are N,
  $X^1$, $X^2$ are halogen such as fluorine, chlorine, bromine or iodine, particularly preferably both chlorine, or
    $C_1$–$C_4$-alkoxy such as methoxy, ethoxy, n-propoxy, isopropoxy, n-butoxy, isobutoxy, sec-butoxy or tert-butoxy, particularly preferably methoxy, ethoxy, n-propoxy or n-butoxy;

$R^1$, $R^2$ are
- $C_1$–$C_{12}$-alkyl, for example methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-heptyl, isoheptyl, n-octyl, n-decyl or n-dodecyl; preferably $C_1$–$C_6$-alkyl such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, particularly preferably $C_1$–$C_4$-alkyl such as methyl, ethyl, n-propyl, isopropyl, n-butyl, isobutyl, sec-butyl or tert-butyl;
- examples of substituted $C_1$–$C_{12}$-alkyl groups are:
  - monohalogenated or polyhalogenated $C_1$–$C_{12}$-alkyl groups such as fluoromethyl, difluoromethyl, trifluoromethyl, chloromethyl, dichloromethyl, trichloromethyl, bromomethyl, dibromomethyl, tribromomethyl, pentafluoroethyl, perfluoropropyl and perfluorobutyl, particularly preferably fluoromethyl, difluoromethyl, trifluoromethyl and perfluorobutyl;
- $C_3$–$C_{12}$-cycloalkyl such as cyclopropyl, cyclobutyl, cyclopentyl, cyclohexyl, cycloheptyl, cyclooctyl, cyclononyl, cyclodecyl, cycloundecyl or cyclododecyl, preferably cyclopentyl, cyclohexyl or cycloheptyl;
- examples of substituted cycloalkyl groups are:
  - 2-methylcyclopentyl, 3-methylcyclopentyl, cis-2,4-dimethylcyclopentyl, trans-2,4-dimethylcyclopentyl, cis-2,5-dimethylcyclopentyl, trans-2,5-dimethylcyclopentyl, 2,2,5,5-tetramethylcyclopentyl, 2-methylcyclohexyl, 3-methylcyclohexyl, 4-methylcyclohexyl, cis-2,6-dimethylcyclohexyl, trans-2,6-dimethylcyclohexyl, cis-2,6-diisopropylcyclohexyl, trans-2,6-diisopropylcyclohexyl, 2,2,6,6-tetramethylcyclohexyl, 2-methoxycyclopentyl, 2-methoxycyclohexyl, 3-methoxycyclopentyl, 3-methoxycyclohexyl, 2-chlorocyclopentyl, 3-chlorocyclopentyl, 2,4-dichlorocyclopentyl, 2,2,4,4-tetrachlorocyclopentyl, 2-chlorocyclohexyl, 3-chlorocyclohexyl, 4-chlorocyclohexyl, 2,5-dichlorocyclohexyl, 2,2,6,6-tetrachlorocyclohexyl, 2-thiomethylcyclopentyl, 2-thiomethylcyclohexyl, 3-thiomethylcyclopentyl, 3-thiomethylcyclohexyl and further derivatives;
- $C_7$–$C_{13}$-aralkyl, preferably $C_7$–$C_{12}$-phenylalkyl such as benzyl, 1-phenethyl, 2-phenethyl, 1-phenylpropyl, 2-phenylpropyl, 3-phenylpropyl, neophyl (1-methyl-1-phenylethyl), 1-phenylbutyl, 2-phenylbutyl, 3-phenylbutyl or 4-phenylbutyl, particularly preferably benzyl;
- $C_6$–$C_{14}$-aryl, for example phenyl, 1-naphthyl, 2-naphthyl, 1-anthryl, 2-anthryl, 9-anthryl, 1-phenanthryl, 2-phenanthryl, 3-phenanthryl, 4-phenanthryl or 9-phenanthryl, preferably phenyl, 1-naphthyl or 2-naphthyl, particularly preferably phenyl;
- $C_6$–$C_{14}$-aryl such as phenyl, 1-naphthyl, 2-naphthyl, 1-anthryl, 2-anthryl, 9-anthryl, 1-phenanthryl, 2-phenanthryl, 3-phenanthryl, 4-phenanthryl or 9-phenanthryl which each bear one or more identical or different substituents selected from among
  - $C_1$–$C_8$-alkyl groups such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-heptyl, isoheptyl and n-octyl; preferably $C_1$–$C_6$-alkyl such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, particularly preferably $C_1$–$C_4$-alkyl such as methyl, ethyl, n-propyl, isopropyl, n-butyl, isobutyl, sec-butyl and tert-butyl;
  - examples of substituted $C_1$–$C_8$-alkyl groups are:
    - monohalogenated or polyhalogenated $C_1$–$C_8$-alkyl groups such as fluoromethyl, difluoromethyl, trifluoromethyl, chloromethyl, dichloromethyl, trichloromethyl, bromomethyl, dibromomethyl, tribromomethyl, pentafluoroethyl, perfluoropropyl and perfluorobutyl, particularly preferably fluoromethyl, difluoromethyl, trifluoromethyl and perfluorobutyl;
  - $C_3$–$C_{12}$-cycloalkyl such as cyclopropyl, cyclobutyl, cyclopentyl, cyclohexyl, cycloheptyl, cyclooctyl, cyclononyl, cyclodecyl, cycloundecyl and cyclododecyl; preferably cyclopentyl, cyclohexyl and cycloheptyl;
  - $C_7$–$C_{15}$-aralkyl, preferably $C_7$–$C_{12}$-phenylalkyl such as benzyl, 1-phenethyl, 2-phenethyl, 1-phenylpropyl, 2-phenylpropyl, 3-phenylpropyl, neophyl (1-methyl-1-phenylethyl), 1-phenylbutyl, 2-phenylbutyl, 3-phenylbutyl and 4-phenylbutyl, particularly preferably benzyl;
  - $C_6$–$C_{14}$-aryl, for example phenyl, 1-naphthyl, 2-naphthyl, 1-anthryl, 2-anthryl, 9-anthryl, 1-phenanthryl, 2-phenanthryl, 3-phenanthryl, 4-phenanthryl and 9-phenanthryl, preferably phenyl, 1-naphthyl and 2-naphthyl, particularly preferably phenyl;
  - halogen, for example fluorine, chlorine, bromine and iodine, particularly preferably fluorine and chlorine;
  - $C_1$–$C_6$-alkoxy groups such as methoxy, ethoxy, n-propoxy, isopropoxy, n-butoxy, isobutoxy, sec-butoxy, tert-butoxy, n-pentoxy, isopentoxy, n-hexoxy and isohexoxy, particularly preferably methoxy, ethoxy, n-propoxy and n-butoxy;
  - $C_6$–$C_{14}$-aryloxy groups such as phenoxy, ortho-cresyloxy, meta-cresyloxy, para-cresyloxy, α-naphthoxy, β-naphthoxy and 9-anthryloxy;
  - silyl groups $SiR^8R^9R^{10}$, where $R^8$ to $R^{10}$ are selected independently from among hydrogen, $C_{1\text{-}12}$-alkyl groups, $C_7$–$C_{15}$-aralkyl groups and $C_6$–$C_{14}$-aryl groups; preference is given to the trimethylsilyl, triethylsilyl, triisopropylsilyl, diethylisopropylsilyl, dimethylhexylsilyl, tert-butyldimethylsilyl, tert-butyldiphenylsilyl, tribenzylsilyl, triphenylsilyl and tri-para-xylylsilyl groups; particular preference is given to the trimethylsilyl group and the tert-butyldimethylsilyl group;
  - silyloxy groups $OSiR^8R^9R^{10}$, where $R^8$ to $R^{10}$ are selected independently from among hydrogen, $C_1$–$C_8$-alkyl groups, $C_7$–$C_{15}$-aralkyl groups and $C_6$–$C_{14}$-aryl groups; preference is given to the trimethylsilyloxy, triethylsilyloxy, triisopropylsilyloxy, diethylisopropylsilyloxy, dimethylhexylsilyloxy, tert-butyldimethylsilyloxy, tert-butyldiphenylsilyloxy, tribenzylsilyloxy, triphenylsilyloxy and tri-para-xylylsilyloxy groups; particular preference is given to the trimethylsilyloxy group and the tert-butyldimethylsilyloxy group;

very particular preference is given to 2,6-dimethylphenyl, 2,6-diisopropylphenyl, mesityl and 2,6-dichlorophenyl;

five- to six-membered nitrogen-containing heteroaryl radicals such as N-pyrrolyl, pyrrol-2-yl, pyrrol-3-yl, N-imidazolyl, 2-imidazolyl, 4-imidazolyl, 1,2,4-triazol-3-yl, 1,2,4-triazol-4-yl, 2-pyridyl, 3-pyridyl, 4-pyridyl, 3-pyridazinyl, 4-pyridazinyl, 2-pyrimidinyl, 4-pyrimidinyl, 5-pyrimidinyl, N-indolyl and N-carbazolyl;

five- to six-membered nitrogen-containing heteroaryl radicals such as N-pyrrolyl, pyrrol-2-yl, pyrrol-3-yl, N-imidazolyl, 2-imidazolyl, 4-imidazolyl, 1,2,4-triazol-3-yl, 1,2,4-triazol-4-yl, 2-pyridyl, 3-pyridyl, 4-pyridyl, 3-pyridazinyl, 4-pyridazinyl, 2-pyrimidinyl, 4-pyrimidinyl, 5-pyrimidinyl, N-indolyl and N-carbazolyl each bearing one or more identical or different substituents selected from among $C_1$–$C_8$-alkyl groups such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-heptyl, isoheptyl and n-octyl; preferably $C_1$–$C_6$-alkyl such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, particularly preferably $C_1$–$C_4$-alkyl such as methyl, ethyl, n-propyl, isopropyl, n-butyl, isobutyl, sec-butyl and tert-butyl;

examples of substituted $C_1$–$C_8$-alkyl groups are: monohalogenated or polyhalogenated $C_1$–$C_8$-alkyl groups such as fluoromethyl, difluoromethyl, trifluoromethyl, chloromethyl, dichloromethyl, trichloromethyl, bromomethyl, dibromomethyl, tribromomethyl, pentafluoroethyl, perfluoropropyl and perfluorobutyl, particularly preferably fluoromethyl, difluoromethyl, trifluoromethyl and perfluorobutyl;

$C_3$–$C_{12}$-cycloalkyl such as cyclopropyl, cyclobutyl, cyclopentyl, cyclohexyl, cycloheptyl, cyclooctyl, cyclononyl, cyclodecyl, cycloundecyl and cyclododecyl; preferably cyclopentyl, cyclohexyl and cycloheptyl;

$C_7$–$C_{13}$-aralkyl, preferably $C_7$–$C_{12}$-phenylalkyl such as benzyl, 1-phenethyl, 2-phenethyl, 1-phenylpropyl, 2-phenylpropyl, 3-phenylpropyl, neophyl (1-methyl-1-phenylethyl), 1-phenylbutyl, 2-phenylbutyl, 3-phenylbutyl and 4-phenylbutyl, particularly preferably benzyl;

$C_6$–$C_{14}$-aryl, for example phenyl, 1-naphthyl, 2-naphthyl, 1-anthryl, 2-anthryl, 9-anthryl, 1-phenanthryl, 2-phenanthryl, 3-phenanthryl, 4-phenanthryl and 9-phenanthryl, preferably phenyl, 1-naphthyl and 2-naphthyl, particularly preferably phenyl;

halogen, for example fluorine, chlorine, bromine and iodine, particularly preferably fluorine and chlorine;

$C_1$–$C_6$-alkoxy groups such as methoxy, ethoxy, n-propoxy, isopropoxy, n-butoxy, isobutoxy, sec-butoxy, tert-butoxy, n-pentoxy, isopentoxy, n-hexoxy and isohexoxy, particularly preferably methoxy, ethoxy, n-propoxy and n-butoxy;

$C_6$–$C_{14}$-aryloxy groups such as phenoxy, ortho-cresyloxy, meta-cresyloxy, para-cresyloxy, α-naphthoxy, β-naphthoxy and 9-anthryloxy;

silyl groups $SiR^8R^9R^{10}$, where $R^8$ to $R^{10}$ are selected independently from among hydrogen, $C_1$–$C_8$-alkyl groups, $C_7$–$C_{15}$-aralkyl groups and $C_6$–$C_{14}$-aryl groups; preference is given to the trimethylsilyl, triethylsilyl, triisopropylsilyl, diethylisopropylsilyl, dimethylhexylsilyl, tert-butyldimethylsilyl, tert-butyldiphenylsilyl, tribenzylsilyl, triphenylsilyl and tri-para-xylylsilyl groups; particular preference is given to the trimethylsilyl group and the tert-butyldimethylsilyl group;

silyloxy groups $OSiR^8R^9R^{10}$, where $R^8$ to $R^{10}$ are selected independently from among hydrogen, $C_1$–$C_8$-alkyl groups, the benzyl radical and $C_6$–$C_{14}$-aryl groups; preference is given to the trimethylsilyloxy, triethylsilyloxy, triisopropylsilyloxy, diethylisopropylsilyloxy, dimethylhexylsilyloxy, tert-butyldimethylsilyloxy, tert-butyldiphenylsilyloxy, tribenzylsilyloxy, triphenylsilyloxy and tri-para-xylylsilyloxy groups; particular preference is given to the trimethylsilyloxy group and the tert-butyldimethylsilyloxy group;

very particular preference is given to 2,5-methyl-N-pyrrolyl, 2,5-diisopropyl-N-pyrrolyl and N-carbazolyl;

$R^3$, $R^4$ are hydrogen or $C_1$–$C_{12}$-alkyl, for example methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-heptyl, isoheptyl, n-octyl, n-decyl or n-dodecyl; preferably $C_1$–$C_6$-alkyl such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, particularly preferably $C_1$–$C_4$-alkyl such as methyl, ethyl, n-propyl, isopropyl, n-butyl, isobutyl, sec-butyl or tert-butyl;

examples of substituted $C_1$–$C_{12}$-alkyl groups are: monohalogenated or polyhalogenated $C_1$–$C_{12}$-alkyl groups such as fluoromethyl, difluoromethyl, trifluoromethyl, chloromethyl, dichloromethyl, trichloromethyl, bromomethyl, dibromomethyl, tribromomethyl, pentafluoroethyl, perfluoropropyl and perfluorobutyl, particularly preferably fluoromethyl, difluoromethyl, trifluoromethyl and perfluorobutyl;

$C_3$–$C_{12}$-cycloalkyl such as cyclopropyl, cyclobutyl, cyclopentyl, cyclohexyl, cycloheptyl, cyclooctyl, cyclononyl, cyclodecyl, cycloundecyl or cyclododecyl, preferably cyclopentyl, cyclohexyl or cycloheptyl;

examples of substituted cycloalkyl groups are: 2-methylcyclopentyl, 3-methylcyclopentyl, cis-2,4-dimethylcyclopentyl, trans-2,4-dimethylcyclopentyl, cis-2,5-dimethylcyclopentyl, trans-2,5-dimethylcyclopentyl, 2,2,5,5-tetramethylcyclopentyl, 2-methylcyclohexyl, 3-methylcyclohexyl, 4-methylcyclohexyl, cis-2,6- dimethylcyclohexyl, trans-2,6-dimethylcyclohexyl, cis-2,6-diisopropylcyclohexyl, trans-2,6-diisopropylcyclohexyl, 2,2,6,6-tetramethylcyclohexyl, 2-methoxycyclopentyl, 2-methoxycyclohexyl, 3-methoxycyclopentyl, 3-methoxycyclohexyl, 2-chlorocyclopentyl, 3-chlorocyclopentyl, 2,4-dichlorocyclopentyl, 2,2,4,4-tetrachlorocyclopentyl, 2-chlorocyclohexyl, 3-chlorocyclohexyl, 4-chlorocyclohexyl, 2,5-dichlorocyclohexyl, 2,2,6,6-tetrachlorocyclohexyl, 2-thiomethylcyclopentyl, 2-thiomethylcyclohexyl, 3-thiomethylcyclopentyl, 3-thiomethylcyclohexyl and further derivatives;

$C_7$–$C_{13}$-aralkyl, preferably $C_7$–$C_{12}$-phenylalkyl such as benzyl, 1-phenethyl, 2-phenethyl, 1-phenylpropyl, 2-phenylpropyl, 3-phenylpropyl, neophyl (1-methyl-1-phenylethyl), 1-phenylbutyl, 2-phenylbutyl, 3-phenylbutyl or 4-phenylbutyl, particularly preferably benzyl;

$C_6$–$C_{14}$-aryl, for example phenyl, 1-naphthyl, 2-naphthyl, 1-anthryl, 2-anthryl, 9-anthryl, 1-phenanthryl, 2-phenanthryl, 3-phenanthryl, 4-phenanthryl or 9-phenanthryl, preferably phenyl, 1-naphthyl or 2-naphthyl, particularly preferably phenyl;

$C_6$–$C_{14}$-aryl such as phenyl, 1-naphthyl, 2-naphthyl, 1-anthryl, 2-anthryl, 9-anthryl, 1-phenanthryl, 2-phenanthryl, 3-phenanthryl, 4-phenanthryl or 9-phenanthryl which each bear one or more identical or different substituents selected from among $C_1$–$C_8$-alkyl groups such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-heptyl, isoheptyl and n-octyl; preferably $C_1$–$C_6$-alkyl such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, particularly preferably $C_1$–$C_4$-alkyl such as methyl, ethyl, n-propyl, isopropyl, n-butyl, isobutyl, sec-butyl and tert-butyl;

examples of substituted $C_1$–$C_8$-alkyl groups are: monohalogenated or polyhalogenated $C_1$–$C_8$-alkyl groups such as fluoromethyl, difluoromethyl, trifluoromethyl, chloromethyl, dichloromethyl, trichloromethyl, bromomethyl, dibromomethyl, tribromomethyl, pentafluoroethyl, perfluoropropyl and perfluorobutyl, particularly preferably fluoromethyl, difluoromethyl, trifluoromethyl and perfluorobutyl;

$C_3$–$C_{12}$-cycloalkyl such as cyclopropyl, cyclobutyl, cyclopentyl, cyclohexyl, cycloheptyl, cyclooctyl, cyclononyl, cyclodecyl, cycloundecyl and cyclododecyl; preferably cyclopentyl, cyclohexyl and cycloheptyl;

$C_7$–$C_{15}$-aralkyl, preferably $C_7$–$C_{12}$-phenylalkyl such as benzyl, 1-phenethyl, 2-phenethyl, 1-phenylpropyl, 2-phenylpropyl, 3-phenylpropyl, neophyl (1-methyl-1-phenylethyl), 1-phenylbutyl, 2-phenylbutyl, 3-phenylbutyl and 4-phenylbutyl, particularly preferably benzyl;

$C_6$–$C_{14}$-aryl, for example phenyl, 1-naphthyl, 2-naphthyl, 1-anthryl, 2-anthryl, 9-anthryl, 1-phenanthryl, 2-phenanthryl, 3-phenanthryl, 4-phenanthryl and 9-phenanthryl, preferably phenyl, 1-naphthyl and 2-naphthyl, particularly preferably phenyl;

halogen, for example fluorine, chlorine, bromine and iodine, particularly preferably fluorine and chlorine;

$C_1$–$C_6$-alkoxy groups such as methoxy, ethoxy, n-propoxy, isopropoxy, n-butoxy, isobutoxy, sec-butoxy, tert-butoxy, n-pentoxy, isopentoxy, n-hexoxy and isohexoxy, particularly preferably methoxy, ethoxy, n-propoxy and n-butoxy;

$C_6$–$C_{14}$-aryloxy groups such as phenoxy, ortho-cresyloxy, meta-cresyloxy, para-cresyloxy, α-naphthoxy, β-naphthoxy and 9-anthryloxy;

silyl groups $SiR^8R^9R^{10}$, where $R^8$ to $R^{10}$ are selected independently from among hydrogen, $C_1$–$C_{12}$-alkyl groups, $C_7$–$C_{15}$-aralkyl groups and $C_6$–$C_{14}$-aryl groups;

preference is given to the trimethylsilyl, triethylsilyl, triisopropylsilyl, diethylisopropylsilyl, dimethylhexylsilyl, tert-butyldimethylsilyl, tert-butyldiphenylsilyl, tribenzylsilyl, triphenylsilyl and tri-para-xylylsilyl groups; particular preference is given to the trimethylsilyl group and the tert-butyldimethylsilyl group;

silyloxy groups $OSiR^8R^9R^{10}$, where $R^8$ to $R^{10}$ are selected independently from among hydrogen, $C_1$–$C_8$-alkyl groups, $C_7$–$C_{15}$-aralkyl groups and $C_6$–$C_{14}$-aryl groups; preference is given to the trimethylsilyloxy, triethylsilyloxy, triisopropylsilyloxy, diethylisopropylsilyloxy, dimethylhexylsilyloxy, tert-butyldimethylsilyloxy, tert-butyldiphenylsilyloxy, tribenzylsilyloxy, triphenylsilyloxy and tri-para-xylylsilyloxy groups; particular preference is given to the trimethylsilyloxy group and the tert-butyldimethylsilyloxy group;

very particular preference is given to 2,6-dimethylphenyl, 2,6-diisopropylphenyl, mesityl and 2,6-dichlorophenyl;

five- to six-membered nitrogen-containing heteroaryl radicals such as N-pyrrolyl, pyrrol-2-yl, pyrrol-3-yl, N-imidazolyl, 2-imidazolyl, 4-imidazolyl, 1,2,4-triazol-3-yl, 1,2,4-triazol-4-yl, 2-pyridyl, 3-pyridyl, 4-pyridyl, 3-pyridazinyl, 4-pyridazinyl, 2-pyrimidinyl, 4-pyrimidinyl, 5-pyrimidinyl, N-indolyl and N-carbazolyl;

five- to six-membered nitrogen-containing heteroaryl radicals such as N-pyrrolyl, pyrrol-2-yl, pyrrol-3-yl, N-imidazolyl, 2-imidazolyl, 4-imidazolyl, 1,2,4-triazol-3-yl, 1,2,4-triazol-4-yl, 2-pyridyl, 3-pyridyl, 4-pyridyl, 3-pyridazinyl, 4-pyridazinyl, 2-pyrimidinyl, 4-pyrimidinyl, 5-pyrimidinyl, N-indolyl and N-carbazolyl each bearing one or more identical or different substituents selected from among $C_1$–$C_8$-alkyl groups such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-heptyl, isoheptyl and n-octyl; preferably $C_1$–$C_6$-alkyl such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, particularly preferably $C_1$–$C_4$-alkyl such as methyl, ethyl, n-propyl, isopropyl, n-butyl, isobutyl, sec-butyl and tert-butyl;

examples of substituted $C_1$–$C_8$-alkyl groups are:
monohalogenated or polyhalogenated $C_1$–$C_8$-alkyl groups such as fluoromethyl, difluoromethyl, trifluoromethyl, chloromethyl, dichloromethyl, trichloromethyl, bromomethyl, dibromomethyl, tribromomethyl, pentafluoroethyl, perfluoropropyl and perfluorobutyl, particularly preferably fluoromethyl, difluoromethyl, trifluoromethyl and perfluorobutyl;

$C_3$–$C_{12}$-cycloalkyl such as cyclopropyl, cyclobutyl, cyclopentyl, cyclohexyl, cycloheptyl, cyclooctyl, cyclononyl, cyclodecyl, cycloundecyl and cyclododecyl; preferably cyclopentyl, cyclohexyl and cycloheptyl;

$C_7$–$C_{13}$-aralkyl, preferably $C_7$–$C_{12}$-phenylalkyl such as benzyl, 1-phenethyl, 2-phenethyl, 1-phenylpropyl, 2-phenylpropyl, 3-phenylpropyl, neophyl (1-methyl-1-phenylethyl), 1-phenylbutyl, 2-phenylbutyl, 3-phenylbutyl and 4-phenylbutyl, particularly preferably benzyl;

$C_6$–$C_{14}$-aryl, for example phenyl, 1-naphthyl, 2-naphthyl, 1-anthryl, 2-anthryl, 9-anthryl, 1-phenanthryl, 2-phenanthryl, 3-phenanthryl, 4-phenanthryl and 9-phenanthryl, preferably phenyl, 1-naphthyl and 2-naphthyl, particularly preferably phenyl;

halogen, for example fluorine, chlorine, bromine and iodine, particularly preferably fluorine and chlorine;

$C_1$–$C_6$-alkoxy groups such as methoxy, ethoxy, n-propoxy, isopropoxy, n-butoxy, isobutoxy, sec-butoxy, tert-butoxy, n-pentoxy, isopentoxy, n-hexoxy and isohexoxy, particularly preferably methoxy, ethoxy, n-propoxy and n-butoxy;

$C_6$–$C_{14}$-aryloxy groups such as phenoxy, ortho-cresyloxy, meta-cresyloxy, para-cresyloxy, α-naphthoxy, β-naphthoxy and 9-anthryloxy;

silyl groups $SiR^8R^9R^{10}$, where $R^8$ to $R^{10}$ are selected independently from among hydrogen, $C_1$–$C_8$-alkyl groups, $C_7$–$C_{15}$-aralkyl groups and $C_6$–$C_{14}$-aryl groups; preference is given to the trimethylsilyl, triethylsilyl, triisopropylsilyl, diethylisopropylsilyl, dimethylhexylsilyl, tert-butyldimethylsilyl, tert-butyldiphenylsilyl, tribenzylsilyl, triphenylsilyl and tri-para-xylylsilyl groups; particular preference is given to the trimethylsilyl group and the tert-butyldimethylsilyl group;

silyloxy groups $OSiR^8R^9R^{10}$, where $R^8$ to $R^{10}$ are selected independently from among hydrogen, $C_1$–$C_8$-alkyl groups, the benzyl radical and $C_6$–$C_{14}$-aryl groups; preference is given to the trimethylsilyloxy, triethylsilyloxy, triisopropylsilyloxy, diethylisopropylsilyloxy, dimethylhexylsilyloxy, tert-butyldimethylsilyloxy, tert-butyldiphenylsilyloxy, tribenzylsilyloxy, triphenylsilyloxy and tri-para-xylylsilyloxy groups; particular preference is given to the trimethylsilyloxy group and the tert-butyldimethylsilyloxy group;

very particular preference is given to 2,5-methyl-N-pyrrolyl, 2,5-diisopropyl-N-pyrrolyl and N-carbazolyl $R^5$ to $R^7$ are selected independently from among hydrogen,
$C_1$–$C_{12}$-alkyl, for example methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-heptyl, isoheptyl, n-octyl, n-decyl and n-dodecyl; preferably $C_1$–$C_6$-alkyl such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, particularly preferably $C_1$–$C_4$-alkyl such as methyl, ethyl, n-propyl, isopropyl, n-butyl, isobutyl, sec-butyl and tert-butyl;

examples of substituted $C_1$–$C_{12}$-alkyl groups are:
monohalogenated or polyhalogenated $C_1$–$C_{12}$-alkyl groups such as fluoromethyl, difluoromethyl, trifluoromethyl, chloromethyl, dichloromethyl, trichloromethyl, bromomethyl, dibromomethyl, tribromomethyl, pentafluoroethyl, perfluoropropyl and perfluorobutyl, particularly preferably fluoromethyl, difluoromethyl, trifluoromethyl and perfluorobutyl;

$C_3$–$C_{12}$-cycloalkyl such as cyclopropyl, cyclobutyl, cyclopentyl, cyclohexyl, cycloheptyl, cyclooctyl, cyclononyl, cyclodecyl, cycloundecyl and cyclododecyl, preferably cyclopentyl, cyclohexyl and cycloheptyl;

examples of substituted cycloalkyl groups are:
2-methylcyclopentyl, 3-methylcyclopentyl, cis-2,4-dimethylcyclopentyl, trans-2,4-dimethylcyclopentyl, cis-2,5-dimethylcyclopentyl, trans-2,5-dimethylcyclopentyl, 2,2,5,5-tetramethylcyclopentyl, 2-methylcyclohexyl, 3-methylcyclohexyl, 4-methylcyclohexyl, cis-2,6-dimethylcyclohexyl, trans-2,6-dimethylcyclohexyl, cis-2,6-diisopropylcyclohexyl, trans-2,6-diisopropylcyclohexyl, 2,2,6,6-tetramethylcyclohexyl, 2-methoxycyclopentyl, 2-methoxycyclohexyl, 3-methoxycyclopentyl, 3-methoxycyclohexyl, 2-chlorocyclopentyl, 3-chlorocyclopentyl, 2,4-dichlorocyclopentyl, 2,2,4,4-tetrachlorocyclopentyl, 2-chlorocyclohexyl, 3-chlorocyclohexyl, 4-chlorocyclohexyl, 2,5-dichlorocyclohexyl, 2,2,6,6-tetrachlorocyclohexyl, 2-thiomethylcyclopentyl, 2-thiomethylcyclohexyl, 3-thiomethylcyclopentyl, 3-thiomethylcyclohexyl and further derivatives;

$C_7$–$C_{13}$-aralkyl, preferably $C_7$–$C_{12}$-phenylalkyl such as benzyl, 1-phenethyl, 2-phenethyl, 1-phenylpropyl, 2-phenylpropyl, 3-phenylpropyl, neophyl (1-methyl-1-phenylethyl), 1-phenylbutyl, 2-phenylbutyl, 3-phenylbutyl and 4-phenylbutyl, particularly preferably benzyl;

$C_6$–$C_{14}$-aryl, for example phenyl, 1-naphthyl, 2-naphthyl, 1-anthryl, 2-anthryl, 9-anthryl, 1-phenanthryl, 2-phenanthryl, 3-phenanthryl, 4-phenanthryl and 9-phenanthryl, preferably phenyl, 1-naphthyl and 2-naphthyl, particularly preferably phenyl;

$C_6$–$C_{14}$-aryl such as phenyl, 1-naphthyl, 2-naphthyl, 1-anthryl, 2-anthryl, 9-anthryl, 1-phenanthryl, 2-phenanthryl, 3-phenanthryl, 4-phenanthryl and 9-phenanthryl which each bear one or more identical or different substituents selected from among $C_1$–$C_8$-alkyl groups such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-heptyl, isoheptyl and n-octyl; preferably $C_1$–$C_6$-alkyl such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, particularly preferably $C_1$–$C_4$-alkyl such as methyl, ethyl, n-propyl, isopropyl, n-butyl, isobutyl, sec-butyl and tert-butyl;

examples of substituted $C_1$–$C_8$-alkyl groups are:
monohalogenated or polyhalogenated $C_1$–$C_8$-alkyl groups such as fluoromethyl, difluoromethyl, trifluoromethyl, chloromethyl, dichloromethyl, trichloromethyl, bromomethyl, dibromomethyl, tribromomethyl, pentafluoroethyl, perfluoropropyl and perfluorobutyl, particularly preferably fluoromethyl, difluoromethyl, trifluoromethyl and perfluorobutyl;

$C_3$–$C_{12}$-cycloalkyl such as cyclopropyl, cyclobutyl, cyclopentyl, cyclohexyl, cycloheptyl, cyclooctyl, cyclononyl, cyclodecyl, cycloundecyl and cyclododecyl; preferably cyclopentyl, cyclohexyl and cycloheptyl;

$C_7$–$C_{15}$-aralkyl, preferably $C_7$–$C_{12}$-phenylalkyl such as benzyl, 1-phenethyl, 2-phenethyl, 1-phenylpropyl, 2-phenylpropyl, 3-phenylpropyl, neophyl (1-methyl-1-phenylethyl), 1-phenylbutyl, 2-phenylbutyl, 3-phenylbutyl and 4-phenylbutyl, particularly preferably benzyl;

$C_6$–$C_{14}$-aryl, for example phenyl, 1-naphthyl, 2-naphthyl, 1-anthryl, 2-anthryl, 9-anthryl, 1-phenanthryl, 2-phenanthryl, 3-phenanthryl, 4-phenanthryl and 9-phenanthryl, preferably phenyl, 1-naphthyl and 2-naphthyl, particularly preferably phenyl;

halogen, for example fluorine, chlorine, bromine and iodine, particularly preferably fluorine and chlorine;

$C_1$–$C_6$-alkoxy groups such as methoxy, ethoxy, n-propoxy, isopropoxy, n-butoxy, isobutoxy, sec-butoxy, tert-butoxy, n-pentoxy, isopentoxy, n-hexoxy and isohexoxy, particularly preferably methoxy, ethoxy, n-propoxy and n-butoxy;

$C_6$–$C_{14}$-aryloxy groups such as phenoxy, ortho-cresyloxy, meta-cresyloxy, para-cresyloxy, α-naphthoxy, β-naphthoxy and 9-anthryloxy;

silyl groups $SiR^8R^9R^{10}$, where $R^8$ to $R^{10}$ are selected independently from among hydrogen, $C_1$–$C_{12}$-alkyl groups, $C_7$–$C_{15}$-aralkyl groups and $C_6$–$C_{14}$-aryl groups;

preference is given to the trimethylsilyl, triethylsilyl, triisopropylsilyl, diethylisopropylsilyl, dimethylhexylsilyl, tert-butyldimethylsilyl, tert-butyldiphenylsilyl, tribenzylsilyl, triphenylsilyl and tri-para-xylylsilyl groups; particular preference is given to the trimethylsilyl group and the tert-butyldimethylsilyl group;

silyloxy groups $OSiR^8R^9R^{10}$, where $R^8$ to $R^{10}$ are selected independently from among hydrogen, $C_1$–$C_8$-alkyl groups, $C_7$–$C_{15}$-aralkyl groups and $C_6$–$C_{14}$-aryl groups; preference is given to the trimethylsilyloxy, triethylsilyloxy, triisopropylsilyloxy, diethylisopropylsilyloxy, dimethylhexylsilyloxy, tert-butyldimethylsilyloxy, tert-butyldiphenylsilyloxy, tribenzylsilyloxy, triphenylsilyloxy and tri-para-xylylsilyloxy groups; particular preference is given to the trimethylsilyloxy group and the tert-butyldimethylsilyloxy group;

very particular preference is given to 2,6-dimethylphenyl, 2,6-diisopropylphenyl, mesityl and 2,6-dichlorophenyl;

five- to six-membered nitrogen-containing heteroaryl radicals such as N-pyrrolyl, pyrrol-2-yl, pyrrol-3-yl, N-imidazolyl, 2-imidazolyl, 4-imidazolyl, 1,2,4-triazol-3-yl, 1,2,4-triazol-4-yl, 2-pyridyl, 3-pyridyl, 4-pyridyl, 3-pyridazinyl, 4-pyridazinyl, 2-pyrimidinyl, 4-pyrimidinyl, 5-pyrimidinyl, N-indolyl and N-carbazolyl;

five- to six-membered nitrogen-containing heteroaryl radicals such as N-pyrrolyl, pyrrol-2-yl, pyrrol-3-yl, N-imidazolyl, 2-imidazolyl, 4-imidazolyl, 1,2,4-triazol-3-yl, 1,2,4-triazol-4-yl, 2-pyridyl, 3-pyridyl, 4-pyridyl, 3-pyridazinyl, 4-pyridazinyl, 2-pyrimidinyl, 4-pyrimidinyl, 5-pyrimidinyl, N-indolyl and N-carbazolyl each bearing one or more identical or different substituents selected from among $C_1$–$C_8$-alkyl groups such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-heptyl, isoheptyl and n-octyl; preferably $C_1$–$C_6$-alkyl such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, particularly preferably $C_1$–$C_4$-alkyl such as methyl, ethyl, n-propyl, isopropyl, n-butyl, isobutyl, sec-butyl and tert-butyl;

examples of substituted $C_1$–$C_8$-alkyl groups are:
monohalogenated or polyhalogenated $C_1$–$C_8$-alkyl groups such as fluoromethyl, difluoromethyl, trifluoromethyl, chloromethyl, dichloromethyl, trichloromethyl, bromomethyl, dibromomethyl, tribromomethyl, pentafluoroethyl, perfluoropropyl and perfluorobutyl, particularly preferably fluoromethyl, difluoromethyl, trifluoromethyl and perfluorobutyl;

$C_3$–$C_{12}$-cycloalkyl such as cyclopropyl, cyclobutyl, cyclopentyl, cyclohexyl, cycloheptyl, cyclooctyl, cyclononyl, cyclodecyl, cycloundecyl and cyclododecyl; preferably cyclopentyl, cyclohexyl and cycloheptyl;

$C_7$–$C_{13}$-aralkyl, preferably $C_7$–$C_{12}$-phenylalkyl such as benzyl, 1-phenethyl, 2-phenethyl, 1-phenylpropyl, 2-phenylpropyl, 3-phenylpropyl, neophyl (1-methyl-1-phenylethyl), 1-phenylbutyl, 2-phenylbutyl, 3-phenylbutyl and 4-phenylbutyl, particularly preferably benzyl;

$C_6$–$C_{14}$-aryl, for example phenyl, 1-naphthyl, 2-naphthyl, 1-anthryl, 2-anthryl, 9-anthryl, 1-phenanthryl, 2-phenanthryl, 3-phenanthryl, 4-phenanthryl and 9-phenanthryl, preferably phenyl, 1-naphthyl and 2-naphthyl, particularly preferably phenyl;

halogen, for example fluorine, chlorine, bromine and iodine, particularly preferably fluorine and chlorine;

$C_1$–$C_6$-alkoxy groups such as methoxy, ethoxy, n-propoxy, isopropoxy, n-butoxy, isobutoxy, sec-butoxy, tert-butoxy, n-pentoxy, isopentoxy, n-hexoxy and isohexoxy, particularly preferably methoxy, ethoxy, n-propoxy and n-butoxy;

$C_6$–$C_{14}$-aryloxy groups such as phenoxy, ortho-cresyloxy, meta-cresyloxy, para-cresyloxy, α-naphthoxy, β-naphthoxy and 9-anthryloxy silyl groups $SiR^8R^9R^{10}$, where $R^8$ to $R^{10}$ are selected independently from among hydrogen, $C_1$–$C_8$-alkyl groups, $C_7$–$C_{15}$-aralkyl groups and $C_6$–$C_{14}$-aryl groups; preference is given to the trimethylsilyl, triethylsilyl, triisopropylsilyl, diethylisopropylsilyl, dimethylhexylsilyl, tert-butyldimethylsilyl, tert-butyldiphenylsilyl, tribenzylsilyl, triphenylsilyl and tri-para-xylylsilyl groups; particular preference is given to the trimethylsilyl group and the tert-butyldimethylsilyl group;

silyloxy groups $OSiR^8R^9R^{10}$, where $R^8$ to $R^{10}$ are selected independently from among hydrogen, $C_1$–$C_8$-alkyl groups, the benzyl radical and $C_6$–$C_{14}$-aryl groups; preference is given to the trimethylsilyloxy, triethylsilyloxy, triisopropylsilyloxy, diethylisopropylsilyloxy, dimethylhexylsilyloxy, tert-butyldimethylsilyloxy, tert-butyldiphenylsilyloxy, tribenzylsilyloxy, triphenylsilyloxy and tri-para-xylylsilyloxy groups; particular preference is given to the trimethylsilyloxy group and the tert-butyldimethylsilyloxy group;

very particular preference is given to 2,5-methyl-N-pyrrolyl, 2,5-diisopropyl-N-pyrrolyl and N-carbazolyl;

halogen, for example fluorine, chlorine, bromine and iodine, preferably fluorine and chlorine, $C_1$–$C_6$-alkoxy, such as methoxy, ethoxy, n-propoxy, isopropoxy, n-butoxy, isobutoxy, sec-butoxy, tert-butoxy, n-pentoxy, isopentoxy, n-hexoxy and isohexoxy, particularly preferably methoxy, ethoxy, n-propoxy and n-butoxy, $NO_2$, silyl groups $SiR^8R^9R^{10}$, where $R^8$ to $R^{10}$ are selected independently from among hydrogen, $C_1$–$C_8$-alkyl groups, $C_7$–$C_{15}$-aralkyl groups and $C_6$–$C_{14}$-aryl groups, preference is given to the trimethylsilyl, triethylsilyl, triisopropylsilyl, diethylisopropylsilyl, dimethylhexylsilyl, tert-butyldimethylsilyl, tert-butyldiphenylsilyl, tribenzylsilyl, triphenylsilyl and tri-para-xylylsilyl groups; particular preference is given to the trimethylsilyl groups and the tert-butyldimethylsilyl group;

silyloxy groups $OSiR^8R^9R^{10}$, where $R^8$ to $R^{10}$ are selected independently from among hydrogen, $C_1$–$C_8$-alkyl groups, $C_7$–$C_{15}$-aralkyl groups and $C_6$–$C_{14}$-aryl groups; preference is given to the trimethylsilyloxy, triethylsilyloxy, triisopropylsilyloxy, diethylisopropylsilyloxy, dimethylhexylsilyloxy, tert-butyldimethylsilyloxy, tert-butyldiphenylsilyloxy, tribenzylsilyloxy, triphenylsilyloxy and tri-para-xylylsilyloxy groups; particular preference is given to the trimethylsilyloxy groups and the tert-butyldimethylsilyloxy group.

In a particular embodiment of the present invention, two adjacent radicals together with the parent aromatic can form a 5- to 10-membered ring. Thus, for example, $R^5$ and $R^6$ in formula I a or $R^5$ and $R^7$ in formula I b can together be: —(CH$_2$)$_3$— (trimethylene), —(CH$_2$)$_4$— (tetramethylene), —(CH$_2$)$_5$— (pentamethylene), —(CH$_2$)$_6$— (hexamethylene), —CH$_2$—CH=CH—, —CH$_2$—CH=CH—CH$_2$—, —CH=CH—CH=CH—, —O—CH$_2$—O—, —O—CH(CH$_3$)—O—, —O—CH—(C$_6$H$_5$)—O—, —O—CH$_2$—CH$_2$—O—, —O—C(CH$_3$)$_2$—O—, —NCH$_3$—CH$_2$—CH$_2$—NCH$_3$—, —NCH$_3$—CH$_2$—NCH$_3$— or —O—Si(CH$_3$)$_2$—O—.

For ease of preparing the complexes of the formulae I a and b, particular preference is given to those in which $R^1$ is identical to $R^2$ and $Nu^1$ is identical to $Nu^2$.

Very particular preference is given to the following complexes of the formula I a:

[2,6-diacetylpyridine-bis(2,6-diisopropylanil)]FeCl$_2$

[2,6-diacetylpyridine-bis(2,6-diisopropylanil)]CoCl$_2$

[2,6-diacetylpyridine-bis(mesitylanil)]FeCl$_2$

[2,6-diacetylpyridine-bis(mesitylanil)]CoCl$_2$

[2,6-diacetylpyridine-bis(mesitylanil)]RuCl$_2$

[2,6-diacetylpyridine-bis(2-methyl-5-isopropylpyrrol-1-ylimine)]-FeCl$_2$

[2,6-diacetylpyridine-bis(2-methyl-5-isopropylpyrrol-1-ylimine)]-CoCl$_2$

[2,6-diacetylpyridine-bis(2,5-diisopropylpyrrol-1-ylimine)]CoCl$_2$

[2,6-diacetylpyridine-bis(2,5-diisopropylpyrrol-1-ylimine)]FeCl$_2$ and also the corresponding dibromides.

Very particular preferred examples of complexes of the formula I b are:

[2,5-diacetylfuran-bis(2,6-diisopropylanil)]FeCl$_2$

[2,5-diacetylfuran-bis(2,6-diisopropylanil)]CoCl$_2$

[2,5-diacetylfuran-bis(mesitylanil)]FeCl$_2$

[2,5-diacetylfuran-bis(mesitylanil)]CoCl$_2$

[2,5-diacetylfuran-bis(mesitylanil)]RuCl$_2$

[2,5-diacetylfuran-bis(2-methyl-5-isopropylpyrrol-1-ylimine)]FeCl$_2$

[2,5-diacetylfuran-bis(2-methyl-5-isopropylpyrrol-1-ylimine)]CoCl$_2$

[2,5-diacetylfuran-bis(2,5-diisopropylpyrrol-1-ylimine)]CoCl$_2$

[2,5-diacetylfuran-bis(2,5-diisopropylpyrrol-1-ylimine)]FeCl$_2$

[2,5-diacetylthiophene-bis(2,6-diisopropylanil)]FeCl$_2$

[2,5-diacetylthiophene-bis(2,6-diisopropylanil)]CoCl$_2$

[2,5-diacetylthiophene-bis(mesitylanil)]FeCl$_2$

[2,5-diacetylthiophene-bis(mesitylanil)]CoCl$_2$

[2,5-diacetylthiophene-bis(mesitylanil)]RuCl$_2$

[2,5-diacetylthiophene-bis(2-methyl-5-isopropylpyrrol-1-ylimine)]FeCl$_2$

[2,5-diacetylthiophene-bis(2-methyl-5-isopropylpyrrol-1-ylimine)]

[2,5-diacetylthiophene-bis(2,5-diisopropylpyrrol-1-ylimine)]CoCl$_2$

[2,5-diacetylthiophene-bis(2,5-diisopropylpyrrol-1-ylimine)]FeCl$_2$ and also the corresponding dibromides.

The complexes of the formulae I a and b can be synthesized by literature methods, as described, for example, in *J. Chem. Soc., Chem. Commun.* 1998, 849 and *J. Am. Chem. Soc.* 1998, 120, 4049 or in PCT/EP/00/07657, published on . . . .

Subsequently, a molecularly defined activator of the formulae II a to II c is added thereto:

$$[(L-H)]^+[(M')Q^1Q^2Q^3Q^4]^- \quad \text{II a}$$

$$[(CAr_3)]^+[(M')Q^1Q^2Q^3Q^4]^- \quad \text{II b}$$

$$[(M')Q^1Q^2Q^3] \quad \text{II c}$$

In these formulae, the variables have the following meaning:

$[L-H]^+$ is a Brønsted acid, where L is an electron-neutral Lewis base, for example an amine of the formula $NR^8R^9R^{10}$, a phosphine of the formula $PR8R^9R^{10}$ or an ether of the formula $OR^1R^2$, where the radicals $R^1$ and $R^2$ and also $R^8$ to $R^{10}$ are selected independently from the same group as defined above. Preferred Lewis bases L are tertiary amines or phosphines; particularly preferred Lewis bases L are tri-n-butylamine, N,N-dimethylaniline and N,N-dimethylbenzylamine.

M' is an element of group 13 of the Periodic Table of the Elements, preferably B or Al.

$Q^1$ to $Q^4$ are selected independently from among hydride, $C_1$–$C_{12}$-alkyl, for example methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-heptyl, isoheptyl, n-octyl, n-decyl and n-dodecyl; preferably $C_1$–$C_6$-alkyl such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, particularly preferably $C_1$–$C_4$-alkyl such as methyl, ethyl, n-propyl, isopropyl, n-butyl, isobutyl, sec-butyl and tert-butyl;

examples of substituted $C_1$–$C_{12}$-alkyl groups are:
monohalogenated or polyhalogenated $C_1$–$C_{12}$-alkyl groups such as fluoromethyl, difluoromethyl, trifluoromethyl, chloromethyl, dichloromethyl, trichloromethyl, bromomethyl, dibromomethyl, tribromomethyl, pentafluoroethyl, perfluoropropyl and perfluorobutyl, particularly preferably fluoromethyl, difluoromethyl, trifluoromethyl and perfluorobutyl;

$C_3$–$C_{12}$-cycloalkyl such as cyclopropyl, cyclobutyl, cyclopentyl, cyclohexyl, cycloheptyl, cyclooctyl, cyclononyl, cyclodecyl, cycloundecyl and cyclododecyl, preferably cyclopentyl, cyclohexyl and cycloheptyl;

examples of substituted cycloalkyl groups are:
2-methylcyclopentyl, 3-methylcyclopentyl, cis-2,4-dimethylcyclopentyl, trans-2,4-dimethylcyclopentyl, cis-2,5-dimethylcyclopentyl, trans-2,5-dimethylcyclopentyl, 2,2,5,5-tetramethylcyclopentyl, 2-methylcyclohexyl, 3-methylcyclohexyl, 4-methylcyclohexyl, cis-2,6-dimethylcyclohexyl, trans-2,6-dimethylcyclohexyl, cis-2,6-diisopropylcyclohexyl, trans-2,6-diisopropylcyclohexyl, 2,2,6,6-tetramethylcyclohexyl, 2-methoxycyclopentyl, 2-methoxycyclohexyl, 3-methoxycyclopentyl, 3-methoxycyclohexyl, 2-chlorocyclopentyl, 3-chlorocyclopentyl, 2,4-dichlorocyclopentyl, 2,2,4,4-tetrachlorocyclopentyl, 2-chlorocyclohexyl, 3-chlorocyclohexyl, 4-chlorocyclohexyl, 2,5-dichlorocyclohexyl, 2,2,6,6-tetrachlorocyclohexyl, 2-thiomethylcyclopentyl, 2-thiomethylcyclohexyl, 3-thiomethylcyclopentyl, 3-thiomethylcyclohexyl and further derivatives;

$C_7$–$C_{13}$-aralkyl, preferably $C_7$–$C_{12}$-phenylalkyl such as benzyl, 1-phenethyl, 2-phenethyl, 1-phenylpropyl, 2-phenylpropyl, 3-phenylpropyl, neophyl (1-methyl-1-phenylethyl), 1-phenylbutyl, 2-phenylbutyl, 3-phenylbutyl and 4-phenylbutyl, particularly preferably benzyl;

$C_6$–$C_{14}$-aryl, for example phenyl, 1-naphthyl, 2-naphthyl, 1-anthryl, 2-anthryl, 9-anthryl, 1-phenanthryl, 2-phenanthryl, 3-phenanthryl, 4-phenanthryl and 9-phenanthryl, preferably phenyl, 1-naphthyl and 2-naphthyl, particularly preferably phenyl;

$C_6$–$C_{14}$-aryl such as phenyl, 1-naphthyl, 2-naphthyl, 1-anthryl, 2-anthryl, 9-anthryl, 1-phenanthryl, 2-phenanthryl, 3-phenanthryl, 4-phenanthryl and 9-phenanthryl which each bear one or more identical or different substituents selected from among $C_1$–$C_8$-alkyl groups such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-heptyl, isoheptyl and n-octyl;

preferably $C_1$–$C_6$-alkyl such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, particularly preferably $C_1$–$C_4$-alkyl such as methyl, ethyl, n-propyl, isopropyl, n-butyl, isobutyl, sec-butyl and tert-butyl;

examples of substituted $C_1$–$C_8$-alkyl groups are:
monohalogenated or polyhalogenated $C_1$–$C_8$-alkyl groups such as fluoromethyl, difluoromethyl, trifluoromethyl, chloromethyl, dichloromethyl, trichloromethyl, bromomethyl, dibromomethyl, tribromomethyl, pentafluoroethyl, perfluoropropyl and perfluorobutyl, particularly preferably fluoromethyl, difluoromethyl, trifluoromethyl and perfluorobutyl;

$C_3$–$C_{12}$-cycloalkyl such as cyclopropyl, cyclobutyl, cyclopentyl, cyclohexyl, cycloheptyl, cyclooctyl, cyclononyl, cyclodecyl, cycloundecyl and cyclododecyl; preferably cyclopentyl, cyclohexyl and cycloheptyl;

$C_7$–$C_{15}$-aralkyl, preferably $C_7$–$C_{12}$-phenylalkyl such as benzyl, 1-phenethyl, 2-phenethyl, 1-phenylpropyl, 2-phenylpropyl, 3-phenylpropyl, neophyl (1-methyl-1-phenylethyl), 1-phenylbutyl, 2-phenylbutyl, 3-phenylbutyl and 4-phenylbutyl, particularly preferably benzyl;

$C_6$–$C_{14}$-aryl, for example phenyl, 1-naphthyl, 2-naphthyl, 1-anthryl, 2-anthryl, 9-anthryl, 1-phenanthryl, 2-phenanthryl, 3-phenanthryl, 4-phenanthryl and 9-phenanthryl, preferably phenyl, 1-naphthyl and 2-naphthyl, particularly preferably phenyl;

halogen, for example fluorine, chlorine, bromine and iodine, particularly preferably fluorine and chlorine;

halide, with the proviso that not more than two radicals $Q^1$ and $Q^2$ can be halide.

Very particular preference is given to all radicals $Q^1$ to $Q^4$ being identical and being selected from among pentafluorophenyl, 3,5-bisperfluoromethylphenyl and ortho-perfluorobiphenyl.

Ar are identical or different and are selected from among
- unsubstituted or substituted $C_6$–$C_{14}$-aryl groups such as phenyl, 1-naphthyl, 2-naphthyl, 1-anthryl, 2-anthryl, 9-anthryl, 1-phenanthryl, 2-phenanthryl, 3-phenanthryl, 4-phenanthryl and 9-phenanthryl, where a substituted $C_6$–$C_{14}$-aryl may bear one or more identical or different substituents selected from among
  - $C_1$–$C_8$-alkyl groups such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-heptyl, isoheptyl and n-octyl; preferably $C_1$–$C_6$-alkyl such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, particularly preferably $C_1$–$C_4$-alkyl such as methyl, ethyl, n-propyl, isopropyl, n-butyl, isobutyl, sec-butyl and tert-butyl;
  - examples of substituted $C_1$–$C_8$-alkyl groups are:
    - monohalogenated or polyhalogenated $C_1$–$C_8$-alkyl groups such as fluoromethyl, difluoromethyl, trifluoromethyl, chloromethyl, dichloromethyl, trichloromethyl, bromomethyl, dibromomethyl, tribromomethyl, pentafluoroethyl, perfluoropropyl and perfluorobutyl, particularly preferably fluoromethyl, difluoromethyl, trifluoromethyl and perfluorobutyl;
  - $C_3$–$C_{12}$-cycloalkyl such as cyclopropyl, cyclobutyl, cyclopentyl, cyclohexyl, cycloheptyl, cyclooctyl, cyclononyl, cyclodecyl, cycloundecyl and cyclododecyl; preferably cyclopentyl, cyclohexyl and cycloheptyl;
  - $C_7$–$C_{15}$-aralkyl, preferably $C_7$–$C_{12}$-phenylalkyl such as benzyl, 1-phenethyl, 2-phenethyl, 1-phenylpropyl, 2-phenylpropyl, 3-phenylpropyl, neophyl (1-methyl-1-phenylethyl), 1-phenylbutyl, 2-phenylbutyl, 3-phenylbutyl and 4-phenylbutyl, particularly preferably benzyl;
  - $C_6$–$C_{14}$-aryl, for example phenyl, 1-naphthyl, 2-naphthyl, 1-anthryl, 2-anthryl, 9-anthryl, 1-phenanthryl, 2-phenanthryl, 3-phenanthryl, 4-phenanthryl and 9-phenanthryl, preferably phenyl, 1-naphthyl and 2-naphthyl, particularly preferably phenyl;
  - halogen, for example fluorine, chlorine, bromine and iodine, particularly preferably fluorine and chlorine; or
  - $NO_2$.

Ar is preferably phenyl.

It is possible to add mixtures of two or more molecularly defined activators of the formulae II a to II c.

As third reactant, an alkylating agent selected from among $LiR^{11}$, $MgR^{11}R^{12}$ and $AlR^{12}R^{13}R^{14}$ is added. In these formulae, the radicals have the following meanings:

$R^{11}$ to $R^{14}$ are selected independently from among
- $C_1$–$C_{12}$-alkyl, for example methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-heptyl, isoheptyl, n-octyl, n-decyl and n-dodecyl; preferably $C_1$–$C_6$-alkyl such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, particularly preferably $C_1$–$C_4$-alkyl such as methyl, ethyl, n-propyl, isopropyl, n-butyl, isobutyl, sec-butyl and tert-butyl;
- $C_3$–$C_{12}$-cycloalkyl such as cyclopropyl, cyclobutyl, cyclopentyl, cyclohexyl, cycloheptyl, cyclooctyl, cyclononyl, cyclodecyl, cycloundecyl and cyclododecyl, preferably cyclopentyl, cyclohexyl and cycloheptyl;
- $C_7$–$C_{13}$-aralkyl, preferably $C_7$–$C_{12}$-phenylalkyl such as benzyl, 1-phenethyl, 2-phenethyl, 1-phenylpropyl, 2-phenylpropyl, 3-phenylpropyl, neophyl (1-methyl-1-phenylethyl), 1-phenylbutyl, 2-phenylbutyl, 3-phenylbutyl and 4-phenylbutyl, particularly preferably benzyl;
- $C_6$–$C_{14}$-aryl, for example phenyl, 1-naphthyl, 2-naphthyl, 1-anthryl, 2-anthryl, 9-anthryl, 1-phenanthryl, 2-phenanthryl, 3-phenanthryl, 4-phenanthryl and 9-phenanthryl, preferably phenyl, 1-naphthyl and 2-naphthyl, particularly preferably phenyl.

Particularly preferred alkylating agents are n-butyllithium, trimethylaluminum, triethylaluminum, triisobutylaluminum, tri-n-hexylaluminum and butyloctylmagnesium ("BOMag").

It is also possible to add mixtures of various alkylating agents.

While the order of addition of the reagents is of critical importance, pressure and temperature conditions can be varied within wide limits. Preference is given to carrying out the reactions at atmospheric pressure. Suitable temperatures are from −20° C. to +120° C., preferably from 0 to 100° C. and particularly preferably from 20 to 80° C. The setting of a temperature profile has been found to be particularly useful; thus, the reaction of the complex of the late transition metal with the molecularly defined activator is preferably carried out at from 60 to 100° C., particularly when the activator is a salt. The subsequent reaction with the alkylating agent is preferably carried out at room temperature.

The reaction is usually carried out in a solvent. Solvents which have been found to be useful are solvents which are inert under the reaction conditions, for example toluene, ortho-xylene, meta-xylene, para-xylene, ethylbenzene and mixtures thereof. Alkanes such as n-heptane or isododecane are also suitable as solvents, also mixtures of alkanes with toluene, ortho-xylene, meta-xylene, para-xylene or ethylbenzene.

The molar ratio of complex I a or I b to activator II a to c can be varied within certain limits. Thus, molar ratios of I a (or I b) to II a or II b or II c of from 10:1 to 1:10 can be chosen; the ratios are preferably from 2:1 to 1:2 and particularly preferably 1:1. The alkylating agent is preferably added in a molar excess based on I a or I b; preference is given to from 2:1 to 1000:1, particularly preferably from 5:1 to 350:1.

The reaction is generally complete after a short time. Suitable reaction times are from 5 minutes to 2 hours, preferably from 15 to 45 minutes.

The process is only successful when air and moisture are carefully excluded, which can be ensured, for example, by employing the Schlenk technique.

The present invention further provides a catalyst system prepared by the process of the present invention.

The catalyst system prepared by the process of the present invention is suitable for the polymerization and copolymerization of olefins.

Pressure and temperature conditions during the polymerization can be selected within wide limits. A suitable pressure range has been found to be from 0.5 bar to 4000 bar; preference is given to from 10 to 75 bar or high-pressure conditions of from 500 to 2500 bar. A suitable temperature range has been found to be from 0 to 250° C., preferably from 40 to 200° C. and particularly preferably from 50 to 185° C.

Suitable monomers are the following olefins: ethylene, propylene, 1-butene, 1-pentene, 1-hexene, 1-octene, 1-decene and 1-undecene, with particular preference being given to ethylene.

Suitable comonomers are α-olefins, for example from 0.1 to 20 mol % of 1-butene, 1-pentene, 1-hexene, 4-methyl-1-pentene, 1-octene, 1-decene or 1-undecene. Isobutene and styrene are also suitable comonomers, also cycloolefins such as cyclopentene, norbornene or norbornadiene or substituted norbornenes.

Solvent which have been found to be useful are toluene, ortho-xylene, meta-xylene, para-xylene and ethylbenzene and also mixtures thereof; a further suitable solvent is, under high-pressure conditions, supercritical ethylene.

The polymerization is generally carried out in the presence of a metal alkyl compound, also referred to as scavenger alkyl. Suitable scavenger alkyls are the same compounds which have been used for preparing the catalyst system of the present invention.

When the use of an aluminum alkyl or lithium alkyl as scavenger alkyl is found to be necessary, it is advantageous to meter-in the aluminum alkyl, magnesium alkyl or lithium alkyl as a solution in a hydrocarbon separately from the catalyst system. However, it is also possible to meter-in the scavenger alkyl together with the catalyst system of the present invention.

Furthermore, the catalyst system of the present invention has been found to be regulatable by means of hydrogen, i.e. the molecular weight of the polymers obtainable by means of the catalyst system of the present invention can be reduced by addition of hydrogen. When sufficient hydrogen is added, waxes are obtained. The hydrogen concentration required also depends on the type of polymerization plant used. A process for the polymerization of olefins using the catalyst system of the present invention in the presence of hydrogen as regulator is likewise provided by the present invention.

Working Example

Unless indicated otherwise, all work was carried out in the absence of air and moisture using standard Schlenk techniques. Apparatus and chemicals were pretreated accordingly. The Fe complexes used can be prepared, for example, as described in *J. Chem. Soc., Chem. Commun.* 1998, 849 and *J. Am. Chem. Soc.* 1998, 120, 4049 or in DE 199 39 415.6. The borate $[PhNH(CH_3)_2][B(C_6H_5)_4]$ is commercially available, for example from Albemarle.

The polymer viscosity was determined in accordance with ISO 1628-3.

Polymerization

A mixture of 7 mg (0.013 mmol) of [2,6-diacetylpyridine-bis(2-methyl-5-isopropylpyrrol-1-ylimine)]FeCl$_2$ and 12 mg (0.015 mmol) of N,N-dimethylanilinium tetrakispentafluorophenylborate in 50 ml of toluene was heated while stirring to 80° C. and then stirred at 80° C. for 30 minutes. It was subsequently cooled to room temperature. 12 ml (=1.68 mg of Fe complex) of the solution obtained were transferred to a 1 l steel autoclave in which 400 ml of toluene and 250 mg of triethylaluminum (as 2 M solution in heptane) had previously been placed. A temperature of 70° C. was then set and the autoclave was pressurized with ethylene to a pressure of 40 bar. After 60 minutes, the polymerization was stopped by venting the autoclave. This gave 57 g of polyethylene as a white powder (viscosity: 2.32 dl/g); the autoclave was free of deposits.

Comparative Experiment 7 mg (0.013 mmol) of [2,6-diacetylpyridine-bis(2-methyl-5-isopropylpyrrol-1-ylimine)]FeCl$_2$, 250 mg of triethylaluminum (as 2M solution in heptane) and 12 mg (0.015 mmol) of N,N-dimethylanilinium tetrakispentafluorophenylborate were added in this order to 50 ml of toluene while stirring. This mixture was heated to 80° C. and then stirred at 80° C. for 30 minutes. It was subsequently cooled to room temperature. 12 ml (=1.68 mg of Fe complex) of the solution obtained were transferred to a 1 l steel autoclave in which 400 ml of toluene and 125 mg of triethylaluminum (as 2 M solution in heptane) had previously been placed. A temperature of 70° C. was then set and the autoclave was pressurized with ethylene to a pressure of 40 bar. No uptake of ethylene was observed. After 90 minutes, no polymer could be found in the autoclave.

We claim:

1. A process for preparing a catalyst system for the polymerization of olefins, which comprises:

initially reacting at least one compound of formula Ia or Ib with a molecular activator of formula IIa or IIb shown below

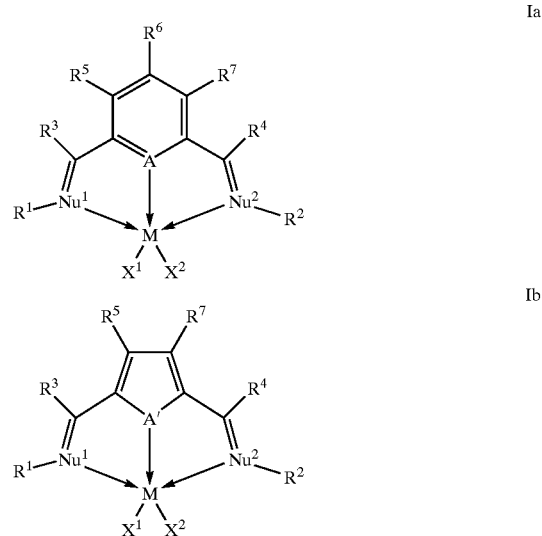

wherein the variables are defined as follows:

M is a transition metal of groups 5 to 10 of the Periodic Table of the Elements, A is selected from the group consisting of N, P and As, A' is selected from the group consisting of O and S, $Nu^1, Nu^2$ are N or P, $X^1, X^2$ are halogen or $C_1-C_4$-alkoxy;

$R^1, R^2$ are unsubstituted or substituted $C_1-C_{12}$-alkyl, $C_3-C_{12}$-cycloalkyl, $C_7-C_{15}$-aralkyl, $C_6-C_{14}$-aryl or a five- or six-membered N-containing heteroaryl, $R^3, R^4$ are hydrogen, unsubstituted or substituted $C_1-C_{12}$-alkyl, $C_3-C_{12}$-cycloalkyl, $C_7-C_{15}$-aralkyl, $C_6-C_{14}$-aryl or a five- or six-membered N-containing heteroaryl, $R^5$ to $R^7$ are each selected independently from the group consisting of hydrogen, unsubstituted or substituted $C_1-C_{12}$-alkyl, $C_3-C_{12}$-cycloalkyl, $C_7-C_{15}$- aralkyl, $C_6$–$C_{14}$-aryl and five- and six-membered N-containing heteroaryl, halogen, $C_1$–$C_6$-alkoxy, $NO_2$, $SiR^8R^9R^{10}$ and $OSiR^8R^9R^{10}$ where adjacent radicals together with the parent heteroaryl optionally form a 5- to 10-membered ring, $R^8$ to $R^{10}$ are selected independently from the group consisting of hydrogen and substituted or unsubstituted $C_1$–$C_{12}$-alkyl, $C_3$–$C_{12}$-cycloalkyl, $C_7$–$C_{15}$-aralkyl and $C_6$–$C_{14}$-aryl;

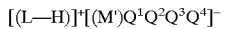      IIa

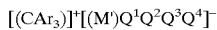      IIb where the radicals have the following meanings:

[L—H]$^+$ is a Bronsted acid, where L is an electron-neutral Lewis base,

M' is an element of group 13 of the Periodic Table of the elements, $Q^1$ to $Q^4$ are selected independently from the group consisting of hydride, unsubstituted or substituted $C_1$–$C_{12}$-alkyl, $C_3$–$C_{12}$-cycloalkyl, $C_7$–$C_{15}$-aralkyl, $C_6$–$C_{14}$-aryl and halide, with the proviso that not more than two radicals $Q^1$ and $Q^2$ are halide;

Ar are identical or different and are selected from the group consisting of unsubstituted or substituted $C_6$–$C_{14}$-aryl; and thereafter reacting the product of the reaction of at least one compound of formula Ia or Ib with a molecular activator of formula IIa or IIb with an alkylating agent selected from the group consisting of $LiR^{11}$, $MgR^{11}R^{12}$ and $AlR^{12}R^{13}R^{14}$, wherein $R^{11}$ to $R^{14}$ are selected independently from the group consisting of unsubstituted or substituted $C_1$–$C_{12}$-alkyl, $C_3$–$C_{12}$-cycloalkyl, $C_7$–$C_{15}$-aralkyl and $C_6$–$C_{14}$-aryl.

2. The process as claimed in claim 1, wherein M in formula Ia and Ib is Fe.

3. The process as claimed in claim 1, wherein A, $Nu^1$ and $Nu^2$ in formula Ia are each N.

4. The process as claimed in claim 1, wherein $Nu^1$ and $Nu^2$ in formula Ib are each N and A' is S.

5. The process as claimed in claim 1, wherein M' in formulae II a or IIb is B or Al.

6. The process as claimed in claim 1, wherein L is a tertiary amine.

7. The process as claimed in claim 1, wherein L is selected from the group consisting of tri-n-butylamine, N,N-dimethylaniline and N,N-dimethylbenzylamine.

8. The process as claimed in claim 1, wherein all radicals Ar are phenyl.

9. The process as claimed in claim 1, wherein the molecularly defined activator of formulae IIa or IIb is one in which $Q^1$ to $Q^4$ are identical and is selected from the group consisting of pentafluorophenyl, 3,5-bis(trifluoromethyl)phenyl and ortho-perfluorobiphenyl.

10. The process as claimed in claim 1, wherein the alkylating agent is an aluminum alkyl selected from the group consisting of trimethylaluminum, triethylaluminum, tri-n-propylaluminum, triisopropylaluminum, tri-n-butylaluminum, triisobutylaluminum and tri-n-hexylaluminum.

11. A catalyst system obtained by the process as claimed in claim 1.

12. A process for the polymerization or copolymerization of olefins, comprising:

polymerizing or copolymerizing olefin monomer in the presence of the catalyst system as claimed in claim 11 at a pressure of 0.5 to 4000 bar and at a temperature ranging from 0 to 250° C.

13. The process as claimed in claim 12, wherein the polymerization is conducted in the presence of hydrogen as molecular weight regulator.

14. The process as claimed in claim 1, which comprises reacting the at least one compound of formula Ia or Ib with a molecular activator of formula IIa or IIb at a temperature ranging from 60 to 100° C., and then reacting the product of the reaction of at least one compound of formula Ia or Ib with a molecular activator of formula IIa or IIb with an alkylating agent at about room temperature.

15. The process as claimed in claim 1, wherein the mole ratio of the complex of IA or Ib to activator IIa or IIb ranges from 10:1 to 1:10.

16. The process as claimed in claim 15, wherein the mole ratio of the complex of IA or Ib to activator IIa or IIb ranges from 2:1 to 1:2.

17. The process as claimed in claim 1, wherein the reaction of both steps is conducted in the presence of an aliphatic hydrocarbon or aromatic hydrocarbon solvent.

* * * * *